United States Patent
Berger et al.

(10) Patent No.: US 11,753,003 B2
(45) Date of Patent: Sep. 12, 2023

(54) SURFACE NORMAL DETERMINATION FOR LIDAR RANGE SAMPLES BY DETECTING PROBE PULSE STRETCHING

(71) Applicant: Zoox, Inc., Foster City, CA (US)

(72) Inventors: Adam Berger, Mountain View, CA (US); Ryan McMichael, Mountain View, CA (US); Bertrand Robert Douillard, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 258 days.

(21) Appl. No.: 16/785,219

(22) Filed: Feb. 7, 2020

(65) Prior Publication Data

US 2020/0172095 A1 Jun. 4, 2020

Related U.S. Application Data

(63) Continuation of application No. 15/487,010, filed on Apr. 13, 2017, now Pat. No. 10,556,585.

(51) Int. Cl.
*B60W 30/09* (2012.01)
*G01S 17/42* (2006.01)
(Continued)

(52) U.S. Cl.
CPC ............ *B60W 30/09* (2013.01); *G01S 17/42* (2013.01); *G01S 17/931* (2020.01);
(Continued)

(58) Field of Classification Search
CPC ...... B60W 30/09; G01S 17/931; G01S 17/42; G05D 1/0088; G05D 1/0214; G05D 1/0236; G08G 1/16
See application file for complete search history.

(56) References Cited

U.S. PATENT DOCUMENTS 3,790,277 A  2/1974  Hogan
4,154,529 A  5/1979  Dyott
(Continued)

FOREIGN PATENT DOCUMENTS

EP  2410358 A1  1/2012
WO  WO03073123  9/2003
WO  WO2012172526 A1  12/2012

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.
(Continued)

*Primary Examiner* — Nicholas Kiswanto
(74) *Attorney, Agent, or Firm* — Lee & Hayes, P.C.

(57) ABSTRACT

A LIDAR system includes a laser emitter configured to emit a laser pulse in a sample direction of a sample area of a scene. A sensor element of the LIDAR system is configured to sense a return pulse, which is a reflection from the sample area corresponding to the emitted laser pulse. The LIDAR system may compare a width of the emitted laser pulse to a width of the return pulse in the time-domain. The comparison of the width of the emitted pulse to the width of the return pulse may be used to determine an orientation or surface normal of the sample area relative to the sample direction. Such a comparison leads to a measurement of the change of pulse width, referred to as pulse broadening or pulse stretching, from the emitted pulse to the return pulse.

20 Claims, 7 Drawing Sheets

(51) Int. Cl.
*G05D 1/00* (2006.01)
*G05D 1/02* (2020.01)
*G08G 1/16* (2006.01)
*G01S 17/931* (2020.01)

(52) U.S. Cl.
CPC ......... *G05D 1/0088* (2013.01); *G05D 1/0214* (2013.01); *G05D 1/0236* (2013.01); *G08G 1/16* (2013.01); *B60W 2420/52* (2013.01); *B60W 2510/20* (2013.01); *B60W 2554/00* (2020.02); *B60W 2710/20* (2013.01)

(56) References Cited

U.S. PATENT DOCUMENTS

| | | | |
|---|---|---|---|
| 4,516,158 A | 5/1985 | Grainge et al. | |
| 4,700,301 A | 10/1987 | Dyke | |
| 4,709,195 A | 11/1987 | Hellekson et al. | |
| 5,098,185 A | 3/1992 | Watanabe et al. | |
| 5,202,742 A | 4/1993 | Frank et al. | |
| 5,303,084 A | 4/1994 | Pflibsen et al. | |
| 5,337,189 A | 8/1994 | Krawczyk et al. | |
| 5,428,438 A | 6/1995 | Komine | |
| 5,703,351 A | 12/1997 | Meyers | |
| 6,046,800 A | 4/2000 | Ohtomo et al. | |
| 6,115,128 A | 9/2000 | Vann | |
| 6,778,732 B1 | 8/2004 | Fermann | |
| 7,089,114 B1 | 8/2006 | Huang | |
| 7,248,342 B1 | 7/2007 | Degnan | |
| 7,255,275 B2 | 8/2007 | Gurevich et al. | |
| 7,259,838 B2 | 8/2007 | Carlhoff et al. | |
| 7,311,000 B2 | 12/2007 | Smith et al. | |
| 7,361,948 B2 | 4/2008 | Hirano et al. | |
| 7,417,716 B2 | 8/2008 | Nagasaka et al. | |
| 7,544,945 B2 | 6/2009 | Tan et al. | |
| 7,969,558 B2 | 6/2011 | Hall | |
| 8,050,863 B2 | 11/2011 | Trepagnier et al. | |
| 8,477,290 B2 | 7/2013 | Yamada | |
| 8,483,881 B2 * | 7/2013 | Ermakov | B25J 9/0003 700/259 |
| 8,675,181 B2 | 3/2014 | Hall | |
| 8,742,325 B1 | 6/2014 | Droz et al. | |
| 8,767,190 B2 | 7/2014 | Hall | |
| 8,836,922 B1 | 9/2014 | Pennecot et al. | |
| 8,996,172 B2 * | 3/2015 | Shah | G01S 17/48 700/258 |
| 9,086,273 B1 | 7/2015 | Gruver et al. | |
| 9,285,464 B2 | 3/2016 | Pennecot et al. | |
| 9,368,936 B1 | 6/2016 | Lenius et al. | |
| 9,489,635 B1 * | 11/2016 | Zhu | G06K 9/6282 |
| RE46,672 E | 1/2018 | Hall | |
| 10,012,729 B2 * | 7/2018 | Freeman | G01S 15/66 |
| 2002/0140924 A1 | 10/2002 | Wangler et al. | |
| 2002/0179822 A1 | 12/2002 | Breed et al. | |
| 2006/0007422 A1 * | 1/2006 | Dimsdale | G01S 7/4868 356/4.02 |
| 2008/0316463 A1 * | 12/2008 | Okada | G02B 26/0816 356/4.01 |
| 2010/0220141 A1 | 9/2010 | Ozawa | |
| 2010/0302528 A1 | 12/2010 | Hall | |
| 2011/0216304 A1 | 9/2011 | Hall | |
| 2011/0255070 A1 | 10/2011 | Phillips et al. | |
| 2014/0291480 A1 * | 10/2014 | Bruder | G01S 7/4816 250/206 |
| 2015/0253428 A1 * | 9/2015 | Holz | G01S 17/36 356/5.01 |
| 2015/0293228 A1 | 10/2015 | Retterath et al. | |
| 2016/0047901 A1 | 2/2016 | Pacala et al. | |
| 2018/0007343 A1 * | 1/2018 | Send | H04N 13/218 |
| 2019/0104980 A1 * | 4/2019 | Farooq | A61B 5/1079 |
| 2019/0130630 A1 * | 5/2019 | Ackerson | G06T 7/557 |

OTHER PUBLICATIONS

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>> 2 pages.

Notice of Allowance from the U.S. Patent and Trademark Office for U.S. Appl. No. 14/462,075, dated Nov. 18, 2015. 8 pages.

Office Action from the U.S. Patent and Trademark Office ofr U.S. Appl. No. 14/462,075, dated Jun. 17, 2015. 14 pages.

PCT Search Report and Written Opinion dated Nov. 19, 2014 for PCT Application No. PCT/US2014/047864, 12 pages.

Rim et al., "The optical advantages of curved focal plane arrays," Optics Express, vol. 16, No. 7, Mar. 31, 2008, 1 page.

Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.

* cited by examiner

SURFACE NORMAL DETERMINATION FOR LIDAR RANGE SAMPLES BY DETECTING PROBE PULSE STRETCHING

CROSS REFERENCE TO RELATED APPLICATIONS

This is a continuation application which claims priority to commonly assigned, co-pending U.S. patent application Ser. No. 15/487,010, filed Apr. 13, 2017. U.S. application Ser. No. 15/487,010 is fully incorporated herein by reference.

BACKGROUND

The term "LIDAR" refers to a technique for measuring distances of visible surfaces by emitting light and measuring properties of the reflections of the light. The term is a combination of parts of the words "light" and "radar," although the term is often thought of as an acronym for "Light Detection and Ranging."

A LIDAR system typically has at least one laser emitter and a corresponding sensor element. The laser emitter may comprise a laser such as an injection laser diode (ILD) that directs light in the direction of an object or surface. The sensor element may comprise a photodetector such as a photomultiplier or avalanche photodiode (APD) that converts light intensity to a corresponding electrical signal. Optical elements such as lenses may be used in the light transmission and reception paths to focus and direct light.

A LIDAR system has signal processing components that analyze reflected light signals to determine the distances to surfaces from which the emitted laser light has been reflected. For example, the system may measure the propagation time of a light signal as it travels from the laser emitter, to the surface, and back to the sensor element. A distance is then calculated based on the flight time and the known speed of light.

Some LIDAR devices can measure the distances of multiple surface points within a scene. For each surface point, the LIDAR system can determine both the distance of the surface point and its angular direction with respect to the device. This capability can be used to create a point cloud comprising three-dimensional coordinates of the multiple surface points.

To measure coordinates of multiple surface points, a LIDAR system may use multiple laser emitters and/or multiple sensor elements. Alternatively, a LIDAR system may physically move one or more lasers and/or detectors to scan over a scene while repeatedly taking measurements of different surface points.

LIDAR systems have been used to inform guidance, navigation, and control systems in autonomous vehicles. In systems such as this, one or more LIDAR devices are configured to produce a surface map indicating the 3D coordinates of visible surface points surrounding the vehicle. A guidance, navigation, and control system analyzes this data to identify obstacles, to perform obstacle avoidance, and to determine a desired path of travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
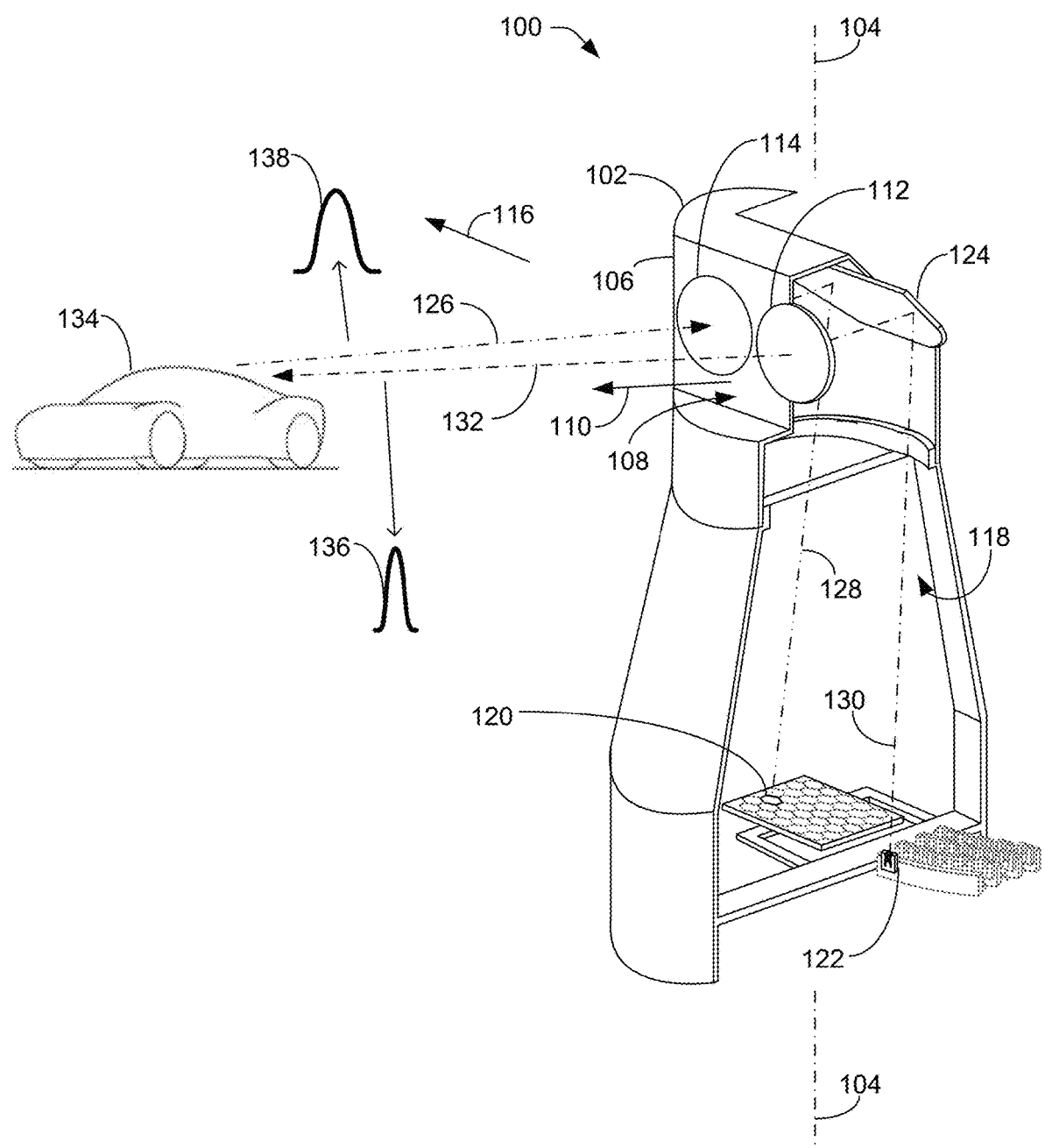
FIG. 1 is a perspective schematic diagram depicting an example LIDAR system and detectable object.

An apparatus and associated techniques are described herein for determining surface orientations (e.g., contours, shapes) of various portions of objects in a scene. The apparatus and techniques can be used in various types of vision systems to produce point clouds indicating three-dimensional (3D) coordinates of surfaces that are visible from the perspective of the apparatus. As an example, the apparatus and techniques may be used by or for a perception system, a planner system, guidance, navigation, and/or control systems of autonomous vehicles such automobiles, aircraft, boats, etc. please describe that this could be provided to a, such as an autonomous vehicle. The apparatus and techniques may also be used in other applications that have a need for real-time, multi-point, scanning distance and avoidance measurements, such as, for example, robots, manned vehicles, and computer vision systems.

In some embodiments, the apparatus may be a LIDAR distance measurement system (hereinafter, "LIDAR System") comprising a rotatable chassis that houses components for implementing techniques and processes described herein. The chassis can rotate about a vertical rotational axis to scan horizontally across a scene, although the chassis may be aligned non-vertically in other examples. The apparatus can include an optical system that defines an overall field of view of a scene surrounding the apparatus. As the chassis rotates, the field of view moves or scans across a scene. The apparatus can include multiple laser emitters positioned within the chassis to project laser light outward through one or more lenses of the optical system, for example. The apparatus can include multiple sensor elements so that light from any particular laser emitter travels in a reflected path through the one or more lenses to a corresponding sensor element. For purposes of discussion, the term "channel" is used herein to refer to an individual laser emitter, corresponding sensor element, and the circuitry associated with the laser emitter and sensor element.

In some examples, a LIDAR system includes a laser emitter, such as a laser diode, configured to emit a laser pulse in a sample direction to a perform a distance measurement of a sample area of a scene. For example, during a scan of a scene surrounding the LIDAR system, the laser emitter may be momentarily aimed at a relatively small area or portion of the scene during rotation of the chassis. A sensor element of the LIDAR system is configured to sense a return pulse, which is a reflection from the sample area corresponding to the emitted laser pulse. The LIDAR system may include a processing unit that receives a signal representative of the return pulse from the sensor element. A processing unit may include, for example, microprocessors, micro controllers, instructions stored in memory, FPGAs, integrated circuits, and/or other electronic circuitry configured to implement functionality as described herein. The processing unit may subsequently compare a width of the emitted pulse to a width of the return pulse in the time-domain. As described below, the processing unit may use the comparison of the width of the emitted pulse to the width of the return pulse to determine an orientation or surface normal of the sample area relative to the sample direction. Such a comparison leads to a measurement of the change of pulse width, referred to as pulse broadening or pulse stretching, from the emitted pulse to the return pulse. In this way, surface orientations (e.g., contours, shapes) of various portions of objects in a scene can be detected.

In some examples, the processing unit may also determine a distance between the sample area and the sensor element based, at least in part, on a time span from when the emitted pulse is emitted and when the return pulse is sensed. This time span is referred to as time-of-flight. In some examples, such determination techniques may assume that the laser source emits a pulse substantially instantaneously when it is instructed to fire. However, in practice, the pulse is not emitted instantaneously. Instead, there is some latency inherent in the components of the LIDAR system. Moreover, the pulse may be Gaussian in nature, ramping up over time to a peak before dropping back. Thus, the actual flight time of the pulse is a time from a peak of the emitted pulse to a peak of the return pulse. However, because a time corresponding to the peak of the emitted pulse may not be known, existing LIDAR systems may use as a proxy the time at which the laser source is instructed to fire.

In some examples, laser emitters and sensor elements of a LIDAR system may have similar or identical physical arrangements or layouts with respect to the overall field of view of the apparatus. For example, as described below, the sensor elements may be arranged within a sensor image frame having an x axis, which is the axis along which the scene is scanned as the chassis rotates, and an orthogonal y axis. In illustrated embodiments in which the rotational axis is vertically aligned, the x axis corresponds to the horizontal axis of the scene and they axis corresponds to the vertical axis of the scene.

In some examples, the sensor elements are arranged as a series of staggered rows that are tilted slightly from the x axis. The two-dimensional nature of this layout allows the sensor elements (e.g., photodiodes) to have an effective resolution, corresponding to a y-axis pitch, that is smaller than the diameter of the sensor components themselves and smaller than would be possible with a linear arrangement. In some examples, the amount of tilt from the x axis is selected so that the sensor elements have a uniform spacing or pitch relative to the y axis of the sensor image frame. In other examples, the y-axis spacing of the lasers and/or sensor elements may be non-uniform.

In some examples, the laser emitters are arranged similarly within an emitter image frame. The emitter image frame has an x axis, also referred to herein as a scan axis, that corresponds to the x axis of the sensor frame. The emitter image frame has a y axis that corresponds to the y axis of the sensor frame. The one or more lenses can direct light produced by the laser emitters from the emitter image frame outwardly into the field of view of the one or more lenses.

The optical system is configured so that light from a laser emitter at a particular x-y position relative to the emitter frame is directed outwardly in a corresponding direction. Such light may be in the form of a laser pulse or burst. Received light (e.g., a reflection of the emitted pulse) from the same direction is directed inwardly by the optical system to the corresponding sensor element, which is at the same x-y position relative to the sensor frame.

In some examples, the sensor elements are mounted on a single, planar printed circuit board. The laser emitters, however, are mounted on multiple printed circuit boards. Each emitter board supports a corresponding row of the laser emitters, and the laser emitters are mounted on edges of the boards to point toward the one or more lenses of the optical system. The edges of the emitter boards may be curved, and the emitter boards are inclined inwardly with respect to each other so that the laser emitters are all equidistant from a lens focal point and are also all directed to converge at the lens focal point.

The measurement channels of the LIDAR system may be used individually and in sequence to perform individual measurements of a number of parameters of a laser pulse. For example, such parameters may be used to determine or calculate distances from the LIDAR system to an object in a scene. For each distance measurement, a laser emitter of a channel emits a laser pulse and a reflection pulse is sensed by the sensor element of the channel. The sensor element creates a return signal representing the intensity of the return pulse in the time domain. When the emitted pulse hits an object in the scene and is reflected, the return signal corresponding to the return pulse is delayed with respect to a reference signal corresponding to the emitted pulse. A cross-correlation may be performed between the return signal and the reference signal. The highest peak of the auto-correlation may be identified, and the timing of the highest peak indicates the round-trip propagation time of the emitted pulse. A distance is then calculated based on the propagation time. In other examples, parameters of a laser pulse may be used to determine or calculate surface normals (e.g., surface orientations) of portions of surfaces of objects in a scene. Herein, some examples describe determining surface normals, but it is to be understood that claimed subject matter is not limited to surface normals, but instead encompasses any type of measurement that indicates orientation of the surface. A surface normal is a convenient mathematical construct that may comprise a vector in a direction that is perpendicular to the surface. The magnitude of such a vector may be proportional to the surface area, or may be unity for a unit normal vector. Again, claimed subject matter is not limited in this respect.

FIG. 1 illustrates an example configuration of a rotatable sensor assembly 100 that may be used as part of a LIDAR sensor device or system. Sensor assembly 100 may include a rotatable chassis 102 that rotates about rotational axis 104. In some examples, the rotational axis is vertical with respect to gravity. In other examples, the rotational axis may be tilted at an angle from vertical.

The chassis 102 has an outer contour that is generally symmetrical about the rotational axis 104. An upper portion 106 of chassis 102 includes a cutout forming a vertically oriented flat surface 108 that faces in a forward direction 110, also referred to as the z-direction, relative to the housing 102. In some implementations, flat surface 108 has one or more openings to accommodate first lens 112 and second lens 114. Forward direction 110 may be parallel with a direction that first lens 112 and second lens 114 face. In other implementations, flat surface 108 is configured to accommodate mounting of a lens holder (not illustrated in FIG. 1) that supports first and second lenses 112 and 114.

Lenses 112 and 114 may be mounted so that their principal axes are generally perpendicular to rotational axis 104, and generally parallel to forward direction 110. In practice, each of lenses 112 and 114 may comprise multiple individual lens elements.

Lenses 112 and 114 may have a common field of view of a scene. Rotation of chassis 102 causes the field of view to move or scan in a scan direction 116. In the illustrated embodiment, in which rotational axis 104 is vertical, scan direction 116 is horizontal.

Chassis 102 may include a partition wall 118 that forms a sensor compartment on one side of chassis 102 and a laser compartment on the other side of chassis 102. Partition wall 118 may prevent or reduce stray light inside chassis 102. Such stray light may undesirably lead to false electronic signals. The sensor compartment houses an array of sensor elements 120. The laser compartment houses one or more rows of laser emitters 122.

In some examples, sensor elements 120 may be arranged to have a uniform spacing or pitch. For instance, sensor elements 120 may be arranged as a series of staggered rows that are tilted slightly in a first direction to produce a uniform pitch in an orthogonal direction.

Laser emitters 122, generally laser diodes, may be arranged within an emitter image frame. Lenses 112 and 114 may direct light produced by laser emitters 122 from the laser image frame outwardly into the lenses' field of view.

Sensor elements 120 may be mounted on a single, planar printed circuit board. Laser emitters 122, however, may be mounted on multiple printed circuit boards. Each printed circuit board supports a corresponding row of laser emitters 122, which may be mounted on edges of the boards and emit toward lenses 112 and 114. The edges may be curved and the printed circuit boards may be inclined inwardly with respect to one another so that laser emitters 122 are all equidistant from a lens focal point and are also all directed to converge at the lens focal point.

First lens 112 is generally above the laser compartment and forward of laser emitters 122. Second lens 114 is generally above the sensor compartment and forward of sensor elements 120.

One or more mirrors 124 are positioned within chassis 102 behind lenses 112 and 114 to redirect or fold emitted and received light between nominally horizontal and vertical directions. Received light 126 enters the chassis generally horizontally through lens 114 and is redirected as downward light 128 by one or more mirrors 124 toward sensor element 120. Laser emitters 122 emit laser light 130 in an upward direction. The emitted light impinges on one or more mirrors 124 and is redirected horizontally, in forward direction 110 through lens 112, producing an outward beam 132.

The LIDAR system may be used to detect or determine any of a number of parameters for an object 134 in a field of view (e.g., in a scene). Such parameters may include distances to various points of the object to determine 3D coordinates of its surface, for example. Such parameters may also include surface normals of relatively small areas that include the various points of the object to determine 3D coordinates of its surface. Detecting or determining parameters of an object involves reflecting at least a portion of outward beam 132, which may be in the form of a pulse, from the object and receiving reflected light 126, also in the form of a pulse, at sensor elements 120.

In some particular examples, each of laser emitters 122 are fired individually and in sequence to obtain individual distance measurements. For each measurement, a single laser is fired in a burst of two closely spaced pulses and a return reflection is detected by a corresponding sensor element 120 (e.g., a photodiode). The sensor element creates a return signal representing the intensity of the reflected light over time. Assuming the emitted burst has been reflected, the return signal comprises a pair of pulses, similar or modified in shape to the emitted pulses, that are delayed with respect to the emitted pulses. For example, outward beam 132 may comprise a pulse 136 having a width narrower than a pulse 138 of reflected light 126, as discussed below. Among a number of other techniques, a cross correlation may be performed between the return signal and a reference signal to determine a time delay. In some examples, another technique for determining time delay may involve Gaussian or polynomial regression of the pulse shape of the return signal. The peak of the auto-correlation is identified, and the timing of the peak is used to determine the round-trip travel time of the emitted burst. In other examples, any number of one or more pulses may be used.

In examples using multiple pulses, the amount by which the pulses of a burst are spaced from each other may be varied over time and between lasers to reduce an impact of cross-talk. Cross-talk may occur, for example, when a photodiode receives a reflection of light that was emitted by a non-corresponding laser, or when a photodiode receives light that was emitted from another LIDAR apparatus. Varying the pulse spacing may reduce ambiguity between different light emissions, so that the cross-correlation inherently tends to mask out reflected bursts whose spacings are different than the spacing of the originally emitted burst. The spacing may be varied across the different lasers and also may be varied over time for an individual laser. For example, the pulse spacing for a particular laser may be changed randomly for every rotation of chassis 102.

The lasers may be sequentially fired in a defined sequence at a rate such that each laser is fired during the maximum expected flight time of a previously fired laser. Thus, two laser emissions (where each emission is a pulse pair) may be "in flight" at any given time.

Two analog to digital converters (ADCs) may be used to digitize signals produced by sensor elements 120. The ADCs operate in an alternate fashion, so that a particular ADC digitizes every other laser emission. For example, the reflection from a first laser burst is digitized by a first ADC, the reflection corresponding to a second laser burst is digitized by a second ADC, the reflection corresponding to a third laser burst is digitized by the first ADC, the reflection corresponding to a fourth laser burst is digitized by the second ADC, and so on. Two ADCs may be adequate because only two laser emissions are in flight at any given time, in this example.

Each laser emitters 122 may be associated with a pair of capacitors that are used to generate two energy pulses for a corresponding individual laser emission. The capacitors of each pair may be charged in common by a regular boost circuit, and discharged into the corresponding laser using a pair of gallium nitride field-effect transistors (GaN FETs). Laser emitters 122 may be divided into two charge banks. The capacitors corresponding to the lasers of one charge bank may be charged while the lasers of the other charge bank are being fired.

A firing order of the lasers may be selected to maximize the physical distance between adjacently-fired lasers, subject to constraints that (a) adjacently-fired lasers should correspond to photodiodes of different ADC groups and (b) the sequence should repeatedly fire all the lasers of the first charge bank and then all the lasers of the second charge bank. Each charge bank may include lasers corresponding to photodiodes of both ADC groups.

Figure 2:
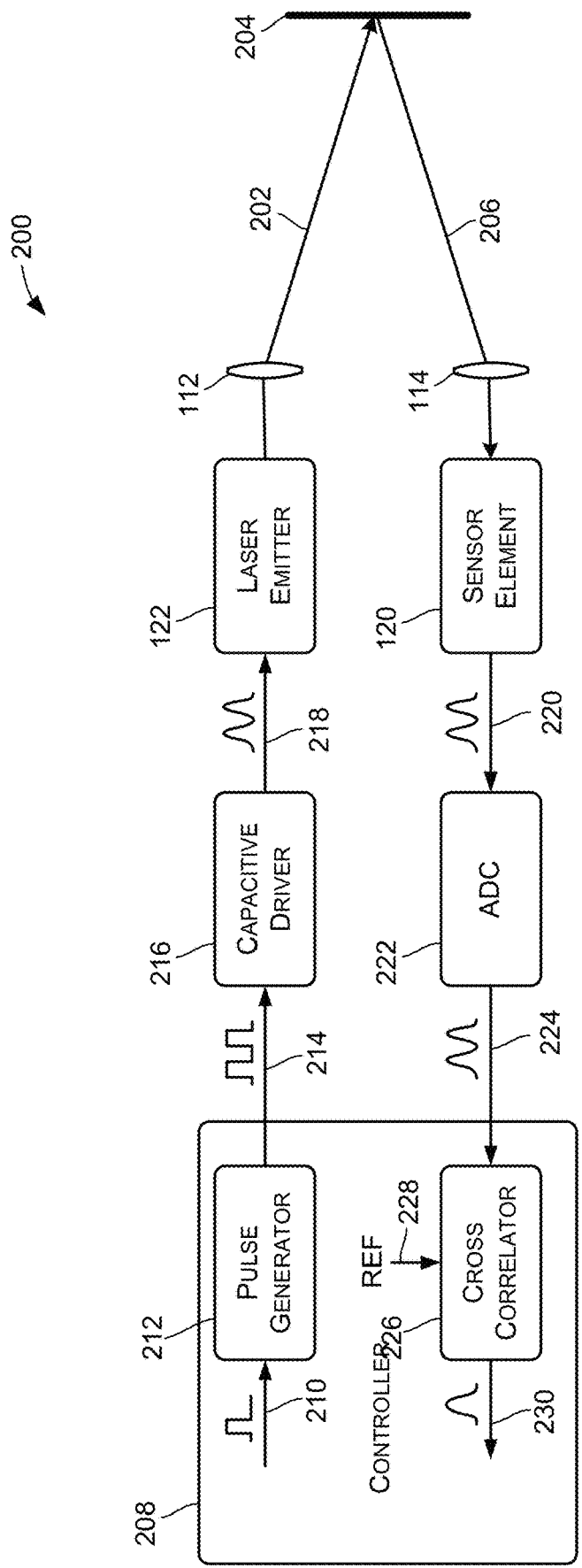
FIG. 2 is a block diagram illustrating high-level components that may, in some examples, be used in conjunction with a LIDAR measurement channel.

FIG. 2 illustrates elements of a LIDAR measurement system 200 that may be used to perform distance and/or surface-normal measurements using a laser/sensor arrangement such as described above for FIG. 1.

A measurement channel includes one of laser emitters 122 and a corresponding one of sensor elements 120. For a single distance measurement, for example, the laser emitter may emit a single pulse or a burst of laser pulses through lens 112 along an outward path 130 and 132. The pulse(s) may be reflected by a surface of object 134 of a scene, through lens 114, and to sensor element 120 along a return path 126 and 128.

Lens 112 (which may itself include more than one lens element) is designed so that beams from laser emitters 122 at different physical positions within the array of laser emitters are directed outwardly at different angles. Specifically, lens 112 may be designed to direct light from laser emitter 122 of a particular channel in a corresponding and unique direction. Lens 114 may be designed so that corresponding sensor element 120 of the channel receives reflected light along the same direction.

System 200 includes a controller 208 to implement control and analysis logic for multiple channels. Controller 208 may be implemented in part by an FPGA (field-programmable gate array), a microprocessor, a DSP (digital signal processor), or a combination of one or more of these and other control and processing elements, and may have associated memory for storing associated programs and data.

To initiate a single measurement, such as distance, using a single channel, controller 208 generates a trigger signal 210. Trigger signal 210 may be received by a pulse generator 212. In response to receiving trigger signal 210, pulse generator 212 may generate a burst signal 214. Burst signal 214 comprises a pair of sequential pulses having rising edges that indicate the times at which a laser emitter should be activated or turned on. As illustrate in FIG. 2, the function of pulse generator 212 may in actual implementation be performed by controller 208.

Burst signal 214 may be received by a capacitive driver 216, which may provide an emitter drive signal 218. Emitter drive signal 218 comprises a pair of sequential energy pulses, corresponding in time to the pulses of burst signal 214. Emitter drive signal 218 is connected to a laser emitter 122 (e.g., as illustrated in FIG. 1) to drive the laser emitter to produce pulses of laser light.

Assuming that emitted laser light 202 is reflected from a surface 204, a sensor element 120 (e.g., as illustrated in FIG. 1) receives reflected light 206 and produces a return signal 220. The return signal may have the same shape as emitter drive signal 218, or may comprise pulses that are widened as compared to the pulses in the emitter drive signal. Shapes may also differ from one another as a result of noise, interference, cross-talk between different emitter/sensor pairs, interfering signals from other LIDAR devices, and so forth. Return signal 220 may also be delayed with respect to emitter drive signal 218 by an amount corresponding to the round-trip propagation time of the emitted laser burst.

An ADC (analog-to-digital converter) 222 receives and digitizes return signal 220 to produce a digitized return signal 224. Digitized return signal 224 is a stream of digital values indicating the magnitude of return signal 220 over time. Note that ADC 222 may be a shared component, and used to digitize signals provided by multiple different sensor elements at different times.

A cross-correlation component 226 may receive digitized return signal 224 and perform a cross-correlation between the digitized return signal and a reference waveform 228, to produce a cross-correlation signal 230. As illustrated in FIG. 2, the function of cross-correlation component 226 may be performed by controller 208.

Reference waveform 228 represents the timing and the intensity of the light that is actually emitted by laser emitter 122. In certain embodiments, reference waveform 228 may be obtained during a calibration cycle. For example, in some embodiments there may be a reference surface at which the output of the laser emitter can be aimed. The reference surface may in some cases comprise part of the support structure of chassis 102, and may be at a known, relatively small distance from lenses 112 and 114. When the output of laser emitter 122 is directed toward the reference surface, capacitive driver 216 drives laser emitter 122 to produce an output burst. Sensor element 120 and ADC 222 are then used to capture a waveform corresponding to the light reflected from the reference surface. This captured waveform may be used as reference waveform 228. Reference waveform 228 may be captured uniquely for each channel, may be stored and used for multiple subsequent measurements, and may be updated over time to account for thermal drift and/or other variables. In some embodiments, reference waveform 228 may be updated at least once per revolution of the chassis.

In other embodiments, one or more different sensors, inside or outside chassis 102, may be used to capture reference waveform 228 during one or more calibration emissions of laser emitter 122. Furthermore, multiple readings may be performed and averaged to create reference waveform 228.

Controller 208 may receive cross-correlation signal 230 and analyze cross-correlation signal 230 to find its highest peak, which indicates the phase difference or time shift between the laser pulses emitted from laser emitter 122 and received at sensor element 120.

Note that FIG. 2 illustrates elements and signals in a simplified manner for purposes of describing general characteristics. In actual implementation, various different types of signals may be generated and used to activate laser emitter 122 to provide one or multiple pulses and to measure the phase difference between the output of the laser emitter and the reflected light that is sensed by the sensor element 120.

Figure 3:
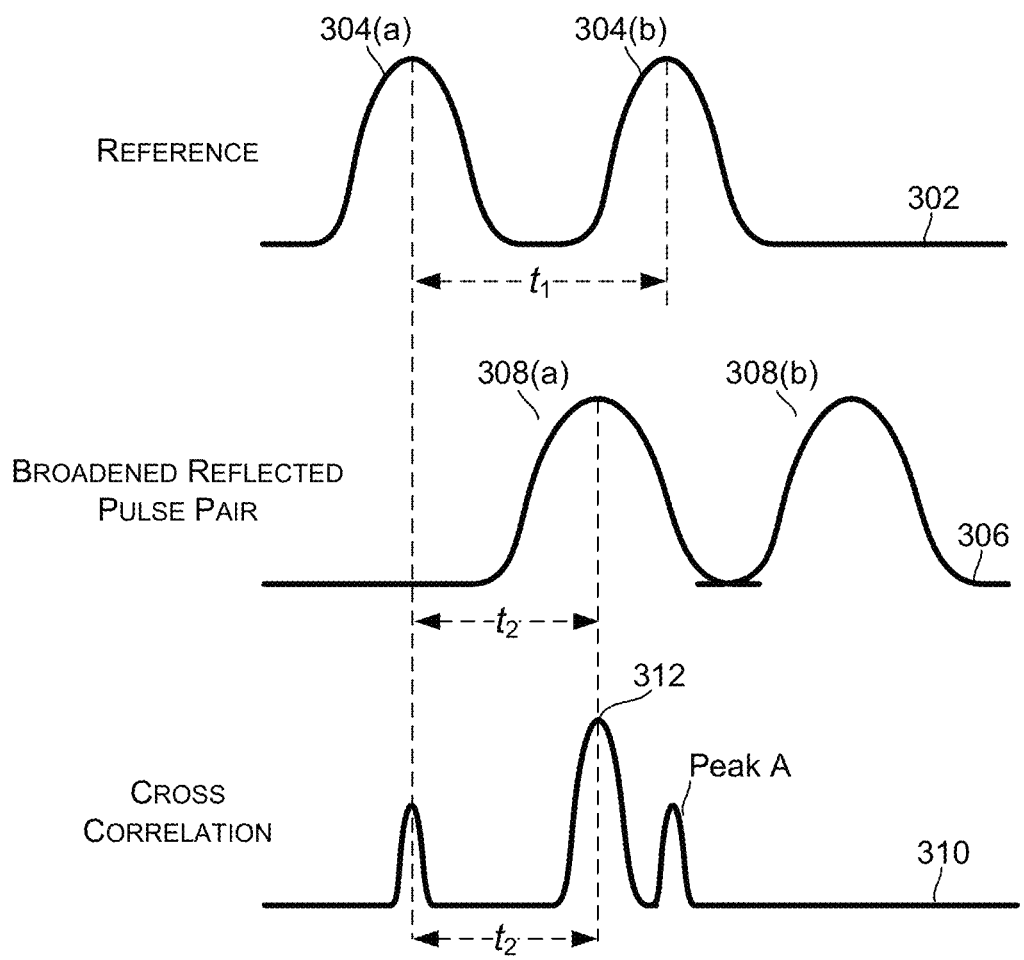
FIG. 3 is a graph illustrating example waveforms that may be generated or received in a LIDAR measurement channel.

FIG. 3 illustrates further details regarding emitted laser pulses, reflected laser pulses, and cross-correlation between the emitted laser pulses and the reflected laser pulses. A first waveform 302 represents timing and intensity of light emitted by a laser emitter, such as 122, which may be indicated by the reference waveform 228 of FIG. 2, for example. Light for a single distance measurement may be emitted as a single pulse or a sequence or burst of multiple pulses. This example involves a pair of pulses 304(a) and 304(b), each having a width of approximately 5 to 20 nanoseconds, though claimed subject matter is not limited in this respect. However, in other examples, sequences or bursts of pulses having more than two pulses of longer or shorter duration can be used. In the illustrated example, the pulses of the pair are spaced from each other by a time interval having a duration $t_1$, which may vary between 20 and 30 nanoseconds, though claimed subject matter is not limited in this respect. The pulses may be generated by the discharge of capacitors through the laser emitter, and therefore generally have Gaussian shapes.

The time interval duration $t_1$ by which pulses 304 are spaced may be different for different generated bursts, and is established by a controller, such as 208, for example. In some implementations, bursts produced by different channels may use different time interval durations, and the durations may be changed for every rotation of chassis 102. In some cases, a time interval duration, used for inter-pulse spacing, may be randomly selected and assigned for each channel, and for each rotation of chassis 102.

A second waveform 306 represents the magnitude of reflected light received and detected by sensor element 120, such as may be indicated by return signal 320 of FIG. 3, for example. Second waveform 306 has a pair of pulses 308(a) and 308(b) corresponding respectively to pulses 304(a) and 304(b). The pulses of second waveform 306, however, are delayed by a time $t_2$ relative to first waveform 302. The timing relationship between the pulses of second waveform 306 should be the same as that of emitted pulses 304.

A third waveform 310 represents the cross correlation between first waveform 302 and second waveform 306, such as may be indicated by cross-correlation signal 230 of FIG. 2, for example. Highest peak 312 of third waveform 310 corresponds in time to $t_2$, which is the phase difference between first waveform 302 and second waveform 306.

In the case of cross-talk, such as a return light signal that is from a different channel, the variable and/or random spacing of the emitted pulses means that the return signal will likely have a different pulse spacing and will not be strongly correlated by the cross-correlation as represented by third waveform 310. This tends to reduce the impact of any cross-talk between channels and/or between different LIDAR devices.

Figure 4:
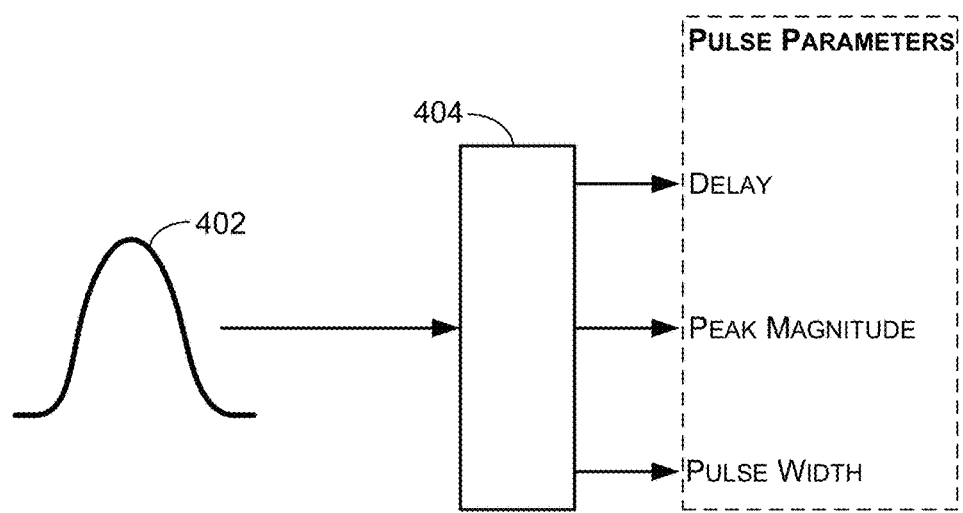
FIG. 4 is a schematic diagram depicting a return pulse having a number of parameters and a functional block that determines such parameters, according to some examples.

FIG. 4 is a schematic diagram depicting a return pulse 402 reflected from a surface of an object (not illustrated in FIG. 4) having a number of parameters and a functional block 404 that determines such parameters, according to some examples. For example, return pulse 402 may be similar to or the same as return signal 220 illustrated in FIG. 2. Among others, return pulse 402 may have parameters such as time delay with respect to a reference signal (e.g., corresponding to a time when an emitted pulse was emitted toward the object), peak magnitude, and pulse width, generally measured or indicated as full width at half maximum (FWHM). In some implementations, functional block 404 may be electronic circuitry (e.g., processor, FPGA, or any combination of analog and digital circuit elements) capable of determining (e.g., measuring, detecting, and/or calculating) such parameters. Functional block 404 may provide pulse parameter data to a computing system for a LIDAR system, for example.

A LIDAR system generally measures distances using time-of-flight of a laser pulse emitted from a laser emitter. The time-of-flight, indicated by the delay parameter of return pulse 402, provides at least a portion of the information used to determined distance between the laser emitter and an object from which the laser pulse is reflected. Peak magnitude may be useful for determining, among other things, optical characteristics, such as reflectivity, of the object. Pulse width may be useful for determining orientation of the object. More specifically, a change of pulse width, referred to as pulse stretching, from the emitted pulse to the detected return pulse, may be used to determine an orientation or a surface normal of the surface of the object from which the emitted pulse reflected, as described below.

Figure 5:
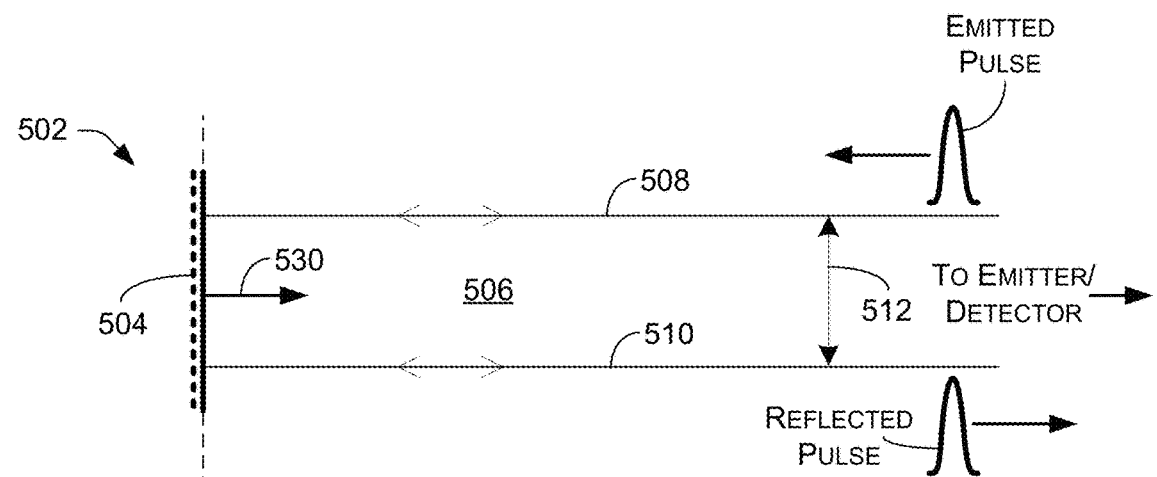
FIG. 5 is a schematic diagram depicting some examples of pulse stretching.
Figure 5:
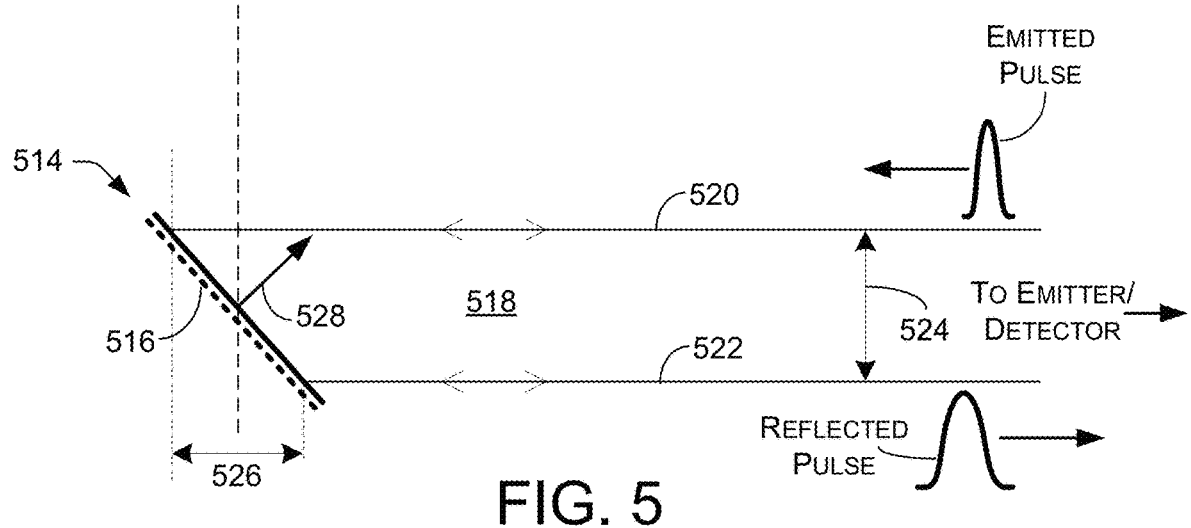

FIG. 5 is a schematic diagram depicting some examples of pulse stretching of a pulse emitted from a laser emitter of a LIDAR system (not illustrated in FIG. 5). In case 502, a surface 504 of an object is normal to a beam 506, which is the light path along which a pulse travels. As explained below, an emitted pulse and reflected pulse in this case will have substantially equal widths. Beam 506 occupies a region of space having an edge denoted by lines 508 and 510. Though lines 508 and 510 indicate that beam 506 is parallel (an approximation), beam 506 has a width 512 that generally diverges from the laser emitter to surface 504. Generally, a laser pulse diverges at a divergence angle so that the size of an area of the surface that intercepts the laser pulse depends, at least in part, on the divergence angle. In other words, such divergence leads to a "spot" size on an object that increases in size (e.g., diameter) as the distance from the laser emitter increases.

In case 514, a surface 516 of an object is oriented at an angle to a beam 518, which is the light path along which a pulse travels. As explained below, an emitted pulse and reflected pulse in this case will have unequal widths. In particular, the reflected pulse will a width that is greater than that of the emitted pulse. Beam 518 occupies a region of space having an edge denoted by lines 520 and 522. Though lines 520 and 522 indicate that beam 518 is parallel (an approximation), beam 518 has a width 524 that generally diverges from the laser emitter to surface 516. Such divergence leads to a "spot" size on an object that increases in size (e.g., diameter) as the distance from the laser emitter increases. Generally, a return pulse comprises light that is reflected from a surface by diffuse reflection, in contrast to specular reflection. Diffuse reflection involves the surface reflecting light and scattered the reflected light into a distribution of angles. Specular reflection, on the other hand, involves the surface reflecting the light at an angle equal to the incidence angle. In case 514, the detector relies, at least in part, on diffuse reflection for detecting the return pulse.

In case 502, all portions of beam 506 travel a same distance from the laser emitter to surface 504 and from the surface to the detector (e.g., light sensor). In case 514, however, upper portions, nearest to line 520, of beam 518 travel a further distance from the laser emitter to surface 516 and from the surface to the detector than lower portions, nearest to line 522, of beam 518. In detail, the upper portion of beam 518 at line 520 travels further than the lower portion of beam 518 at line 522 by a distance 526. Thus, a portion of a pulse travelling nearest line 520 will have a longer time-of-flight as compared to a portion of the pulse travelling nearest line 522. In the time domain, this uneven travel time results in a broadening of the pulse, as measured by the detector. In other words, the width of the return pulse is greater than the width of the emitted pulse in case 514. Such pulse widening measured in the return pulse may be used to infer the orientation of the surface that reflected the emitted pulse. The orientation may be represented by a surface normal 528 which, by definition, is perpendicular to surface 516. The greater the angle of the surface normal from the beam direction, the greater the pulse broadening. Or in inverse terms, the greater the measured pulse broadening of the return pulse, the greater the angle of the surface normal from the beam direction. In contrast, in case 502, the return pulse does not experience broadening and thus the surface normal 530 of surface 504 is parallel to the beam direction.

Figure 6:
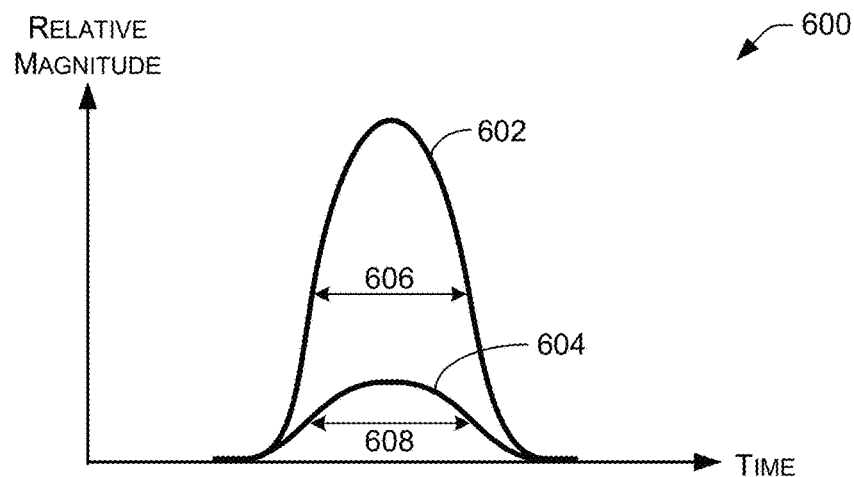
FIG. 6 illustrates some examples of probe pulse stretching.

FIG. 6 illustrates some examples of pulse width broadening or pulse stretching as measured for a return pulse originating at a reflecting surface, such as surface 504 or 516, illustrated in FIG. 5. Graph 600 includes plots of relative magnitudes of an emitted pulse 602 and a return pulse 604 in the time domain. For example, emitted pulse 602 may be the same as or similar to a pulse generated by laser emitter 122 and return pulse 604 may be the same as or similar to return signal 220 (e.g., as illustrated in FIGS. 1 and 2). Emitted pulse 602 has a FWHM 606 and return pulse 604 has a FWHM 608. Referring to FIG. 5, for case 502, FWHM 606 and FWHM 608 are equal, because the surface normal 530 of surface 504 is parallel to the beam direction. However, for case 514, FWHM 608 of return pulse 604 is greater than FWHM 608 of emitted pulse 602 because the surface normal 528 of surface 516 is at a non-zero angle to the beam direction.

In some particular examples, for case 502, FWHM 606 and FWHM 608 may be equal at about 10 nanoseconds (ns). For case 514, FWHM 606 of emitted pulse 602 may be about 10 ns and FWHM 608 of return pulse 604 may be about 10.02 ns, for surface normal 528 being at a 45 degree angle from the beam direction. This is a broadening of about 0.02 ns. In examples of other angles, broadening may be about 0.07 ns for an angle of 60 degrees, 0.11 ns for an angle of 65 degrees, 0.18 ns for an angle of 70 degrees, 0.34 ns for an angle of 75 degrees, 0.78 ns for an angle of 80 degrees, 1.23 ns for an angle of 82 degrees, and 3.09 ns for an angle of 85 degrees. The numerical examples above indicate that pulse stretching non-linearly increases as the angle increase.

Figure 7:
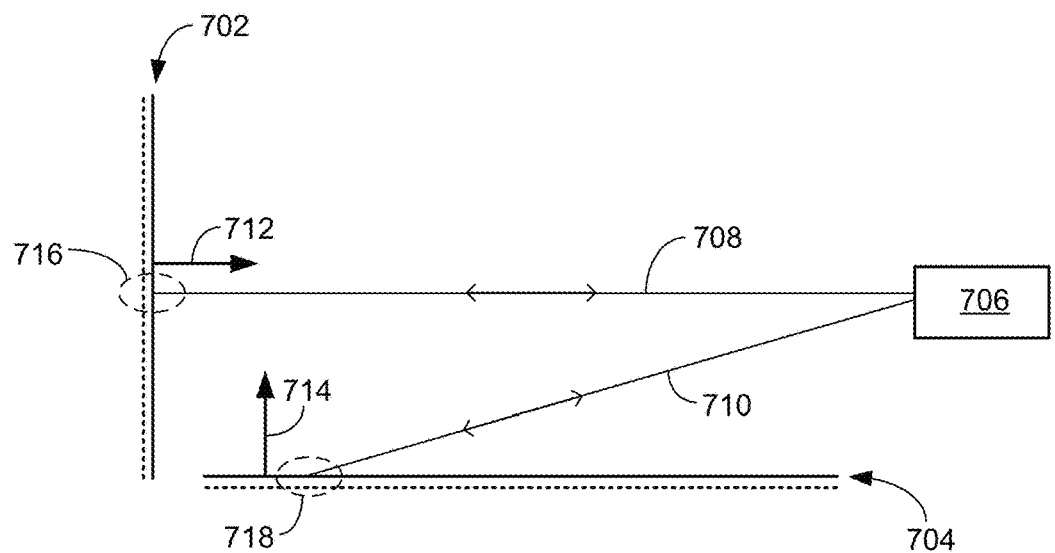
FIG. 7 is a schematic diagram depicting some examples of pulse stretching due to interactions with a vertical surface and a horizontal surface.

FIG. 7 is a schematic diagram depicting some examples of pulse stretching due to interactions with a (vertical) surface 702 and a (horizontal) surface 704. A LIDAR system 706, which may be mounted on a vehicle, can emit pulses in a number of different directions, such as along direction 708 or along direction 710. Such pulse emission can occur for a process of probing and sampling the environment (e.g., scene) around the vehicle, for example. For navigating the vehicle, it is desirable to detect the presence of objects, such as a wall, another vehicle, the ground, and so on. For example, surface 702 may be a wall or a vertical portion of another vehicle. Surface 704 may be a portion of a road surface. A surface normal 712 of surface 702 is different from a surface normal 714 of surface 704. A technique to determine and to distinguish between surface normals 712 and 714 may involve measuring pulse width broadening of a pulse emitted along direction 708 and measuring pulse width broadening of a pulse emitted along direction 710. The pulse emitted along direction 708 reflects from a surface portion 716 of surface 702. The orientation or surface normal of surface portion 716 need not be the same as other portions of surface 702. If the pulse were emitted along a line different from 708 onto another portion of surface 702 then, generally, the orientation of that portion of surface 702 may be different from that of 716, for example.

Pulse broadening is, at least in part, a function of the direction of the surface normal with respect to the travel direction of the pulse. Thus, a pulse emitted in direction 708 and reflected from surface portion 716 may not be broadened, and LIDAR system 706 may determine that surface normal 712 of surface portion 716 is parallel to direction 708. By a similar process, a pulse emitted in direction 710 and reflected from surface portion 718 may be broadened, and LIDAR system 706 may determine the angle at which surface normal 714 of surface portion 718 is with respect to direction 708.

Figure 8:
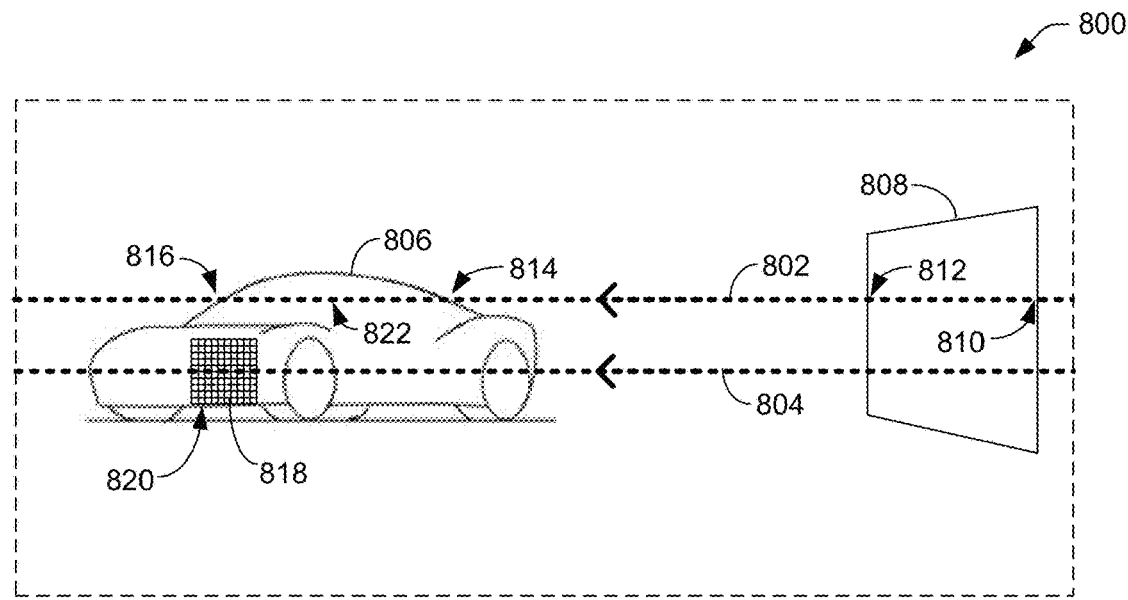
FIG. 8 is a perspective schematic diagram depicting LIDAR scans across a scene, according to some examples.

FIG. 8 is a perspective schematic diagram depicting a scene 800 with applied LIDAR scans, indicated by lines 802 and 804, across the scene, according to some examples. For example, a LIDAR system such as 100 illustrated in FIG. 1 may perform such scans. Two objects in scene 800 are a vehicle 806 and a wall 808. The LIDAR scans may scan from right to left in the scene, as chassis 102, for example, rotates, as illustrated in FIG. 1. Generally, scans are sequentially repeated while varying scan lines. For example, a first scan line 802 may sweep across scene 800 at a first level, and a second scan line 804 may sweep across scene 800 at a second level. Thus, a plurality of such scans may cover most, if not all, of an entire scene. FIG. 8 illustrates merely two such scans.

In an example, a scan includes a number of pulses emitted by a laser emitter 122 of LIDAR system along line 802. Each pulse travels to a different portion of scene 800. For example, some pulses will travel toward and impinge on different surfaces of vehicle 806 or wall 808. Reflections from these different surfaces will produce respective return pulses that travel back to a sensor element 120 of the LIDAR system. Widths of the return pulses may be compared with widths of the corresponding emitted pulses to measure the amount of pulse stretching, which can indicate the surface orientation of the particular surface from which a return pulse originated.

For example, the scan represented by line 802 includes pulses emitted across wall 808 from edge 810 to edge 812, and across vehicle 806 from edge 814 to edge 816. This scan, the scan represented by line 804, and a number of additional scans may be used to determine distances and orientations of many relatively small surface portions of objects in scene 800. For example, each small surface 818 of vehicle 806 that is scanned by a pulse may be in a grid pattern 820, a small part of which is illustrated in FIG. 8. With a knowledge of distances and/or surface normals for each of the small surfaces of grid pattern 818, the LIDAR system may generate a 3D mesh of vehicle 806. A navigation system for vehicle 806 may, for example, use such a 3D mesh to model physical aspects of the vehicle (e.g., for identification, avoidance, and so on).

Generally, objects of a scene will include discontinuities, edges, or other surface features that lead to ambiguous measurements of surface normals and/or distances. For example, a small surface area 822 measured by a pulse emitted toward this portion of vehicle 806 may comprise a flat surface, which may lead to satisfactory measurements. If surface area 822 comprises a sharply curved surface, a recess, and edge, or other discontinuous feature, then a measurement of a surface normal for surface area 822 may produce a value that is ambiguous, as explained below. In some embodiments, the LIDAR system may use a 3D mesh of the surface of vehicle 806 (or other object) to resolve such an ambiguity. For example, if pulse widening measurements yield more than one measurement for a surface normal of a particular area of a vehicle, a 3D mesh of the vehicle may provide information about the particular area that can be used to select the correct surface normal from among the two or more candidates. A 3D mesh may be retrieved from memory, which may include a library or table of 3D meshes for various vehicles or other objects.

On the other hand, in other embodiments, measured surface normals may be used to generate or "fill in the blanks" of a 3D mesh. For example, a 3D mesh may be missing distance measurements for particular areas of an object. Surface normal measurements of those particular areas may allow for the completion of the 3D mesh. This situation may occur, for example, if a portion of the surface of the object has a feature that prevents an accurate distance measurement, but the feature does not prevent a surface normal measurement.

In some embodiments, deep learning systems trained on LIDAR data, such as distance and/or surface normal measurements, can take advantage of large amounts of scene data beyond 3D meshes or structures of individual objects. For example, machine learning processes can provide static and dynamic modelling and classifications for an entire scene. In some implementations, a 3D mesh based on distance measurements is generated using a number of assumptions. Providing surface normal data may also lead to fewer assumptions about scene structures. Providing surface normal data may also allow for an evaluation of the accuracy of mesh generation, for example.

Figure 9:
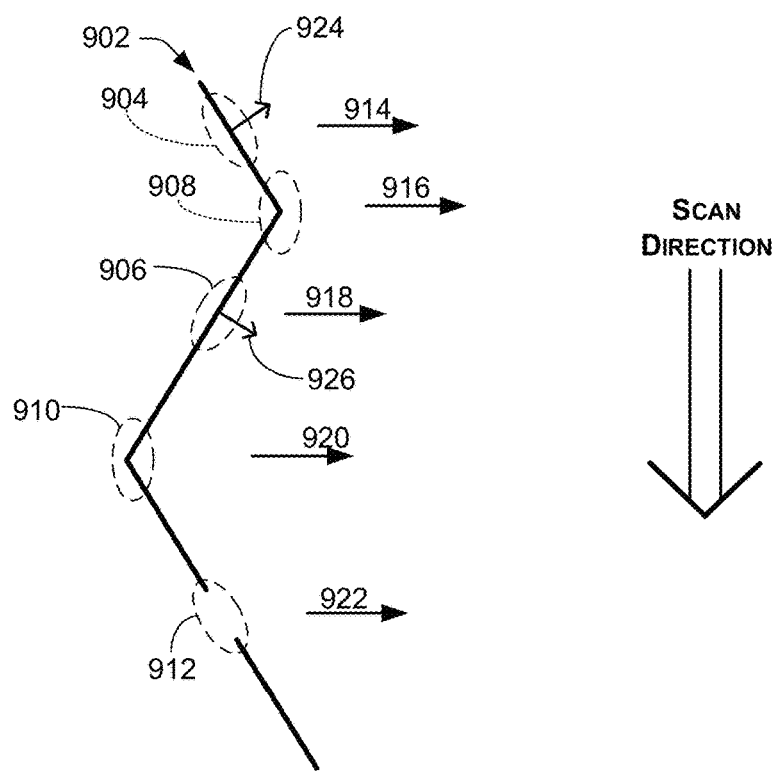
FIG. 9 is a schematic diagram depicting techniques for detecting and compensating for measurement ambiguities, according to some examples.

FIG. 9 is a schematic diagram depicting a number of possible surface characteristics that may lead to measurement ambiguities, according to some examples. Surface 902 is a side view of a portion of a surface of an object, such as vehicle 806. Surface 902 includes flat surfaces 904 and 906, convex surface 908, concave surface 910, and discontinuous surface 912. A scan across surface 902 may include a number of emitted pulses that lead to reflections and return pulses 914-922 from each of flat surfaces 904 and 906, convex surface 908, concave surface 910, and discontinuous surface 912.

In one ambiguity example, a return pulse 914 originating from flat surface 904 may result in pulse broadening that is equal to that of a return pulse 918 originating from flat surface 906. Thus, a measured surface normal for flat surface 904 may be the same for flat surface 906, although the actual surface normals 924 and 926 are different from one another.

In another ambiguity example, a return pulse 916 originating from convex surface 908 may result in pulse broadening that indicates the possibility of the surface normal being in the direction of 924 and 926, since half of convex surface 908 is in direction 924 and the other half of the surface is in the direction 926. Thus, a measured surface normal for convex surface 908 may not yield a single measurement. Additionally, the surface normal of convex surface 908 may in fact be difficult to define, since it includes a discontinuity. This difficulty may be resolved, for example, by relying on measured surface normals of neighboring surface areas, or by using distance measurements of a 3D mesh, just to name a few possibilities.

In another ambiguity example, a return pulse 920 originating from concave surface 910 may result in pulse broadening that indicates the possibility of the surface normal being in the direction of 924 and 926, since half of concave surface 910 is in direction 924 and the other half of the surface is in the direction 926. Thus, a measured surface normal for concave surface 910 may not yield a single measurement. Additionally, the surface normal of concave surface 910 may in fact be difficult to define, since it includes a discontinuity. This difficulty may be resolved, for example, by relying on measured surface normals of neighboring surface areas, or by using distance measurements of a 3D mesh, just to name a few possibilities.

In still another ambiguity example, a return pulse 922 originating from discontinuous surface 912 may have a complex structure that prevents a definitive measurement of pulse broadening. Thus, a measured surface normal for discontinuous surface 912 may not yield a measurement. Additionally, the surface normal of discontinuous surface 912 may in fact be difficult to define, since it includes a discontinuity. This difficulty may be resolved, for example, by relying on measured surface normals of neighboring surface areas, or by using distance measurements of a 3D mesh, just to name a few possibilities. For example, a LIDAR system may determine orientation or a surface normal of problematic areas, such as discontinuities or small areas that fall between two measured areas, by interpolation. In other examples, interpolation may be used to detect or determine a presence of a surface discontinuity between two measured areas.

Figure 10:
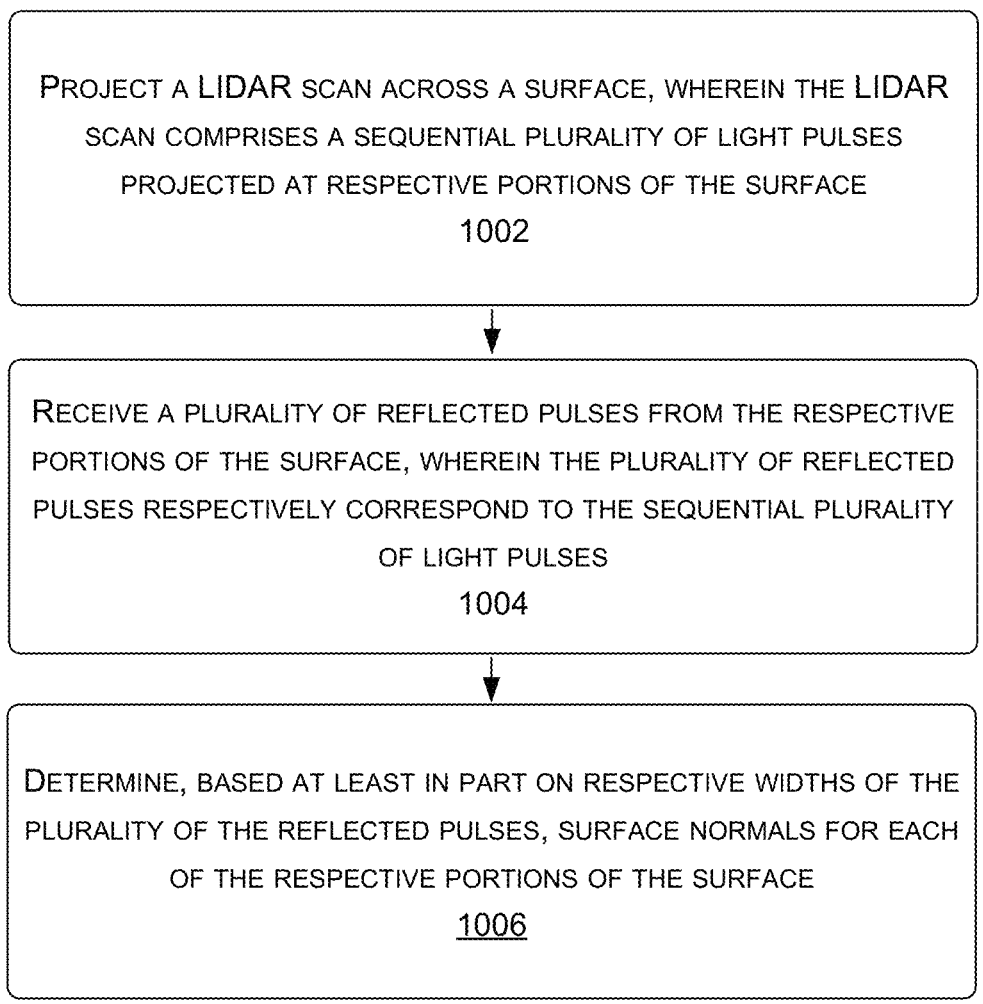
FIG. 10 is a flow diagram illustrating a process for determining surface features, according to some examples.

FIG. 10 is a flow diagram illustrating a process 1000 for determining surface features, according to some embodiments. For example, process 1000 may be performed by a processor in a LIDAR system. In some implementations, such a processor may be in the LIDAR system and in other implementations the processor may be remote from the LIDAR system.

At block 1002, a processor may instruct one or more laser emitters to project a LIDAR scan across a surface in a scene. The LIDAR scan may comprise a sequential plurality of laser pulses projected at respective portions of the surface, for example. The LIDAR scan may occur during a rotation of a LIDAR system that includes laser emitters, sensor elements, and an optical system. The rotation is about an axis that is substantially perpendicular to the direction of the projected laser pulses, for example.

At block 1004, the processor may receive measurement values for a plurality of return pulses from the respective portions of the surface. The plurality of return pulses respectively correspond to the sequential plurality of laser pulses.

At block 1006, the processor may determine, based at least in part on respective widths of the plurality of the return pulses, surface normals for each of the respective portions of the surface. In some implementations, information regarding the surface normals may be used as training data for a machine learning system, which can subsequently provide 3D structure information about the surface. In some implementations, information regarding the surface normals may be provided to a navigation system of a vehicle.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
a laser emitter to emit a first laser pulse and a second laser pulse;
a sensor to sense a first return pulse associated with the first laser pulse reflected from a surface, and a second return pulse associated with the second laser pulse; and
one or more processors to perform operations comprising:
determining a first surface area of the surface based, at least in part, on the first return pulse;
determining a second surface area of the surface based, at least in part, on the second return pulse;
determining a first orientation of the surface based, at least in part, on a comparison between a first width of the first laser pulse and a second width of the first return pulse; and
determining a surface discontinuity between the first surface area and the second surface area based, at least in part, on a comparison between the first orientation and a second orientation of the second surface area.

2. The device of claim 1, wherein the comparison is a first comparison, the one or more processors to perform further operations comprising:
determining a distance between the surface and the sensor based, at least in part, on a second comparison between a first time associated with the first laser pulse and a second time associated with the first return pulse.

3. The device of claim 1, wherein the first width and the second width are represented in a time domain.

4. The device of claim 1, the one or more processors to perform further operations comprising:
determining an area of the surface based, at least in part, on a distance between the surface and the sensor and on a divergence angle associated with the first laser pulse.

5. The device of claim 1, the one or more processors to perform further operations comprising:
generating navigation instructions for controlling a direction of a vehicle based at least in part on the first orientation of the surface.

6. The device of claim 1, the one or more processors to perform further operations comprising:
controlling the laser emitter and the sensor to rotate about an axis that is substantially perpendicular to a sample direction in which the first laser pulse is emitted.

7. A method comprising:
emitting a first laser pulse and a second laser pulse toward a surface;
receiving a first return pulse associated with a first surface area of the surface, and a second return pulse associated with a second surface area of the surface, the first return pulse being received based at least in part on the first laser pulse, the second return pulse being received based at least in part on the second laser pulse;
determining, based at least in part on a comparison between a first width of the first laser pulse and a second width of the first return pulse, a first orientation of the surface; and
determining a surface discontinuity between the first surface area and the second surface area based, at least in part, on a comparison between the first orientation and a second orientation of the second surface area.

8. The method of claim 7, further comprising:
determining, based at least in part on the comparison, a surface normal associated with the first surface area; and
providing the surface normal as training data to a machine learned model.

9. The method of claim 7, further comprising:
providing a known distance and a known orientation associated with the surface as training data to a machine learned model.

10. The method of claim 7, further comprising:
determining, based at least in part on the comparison, a surface normal associated with the first surface area;
inputting the surface normal to a machine learned model; and
receiving, from the machine learned model and based at least in part on the surface normal, one or more of a distance or an orientation of the surface.

11. The method of claim 7, further comprising:
determining, based at least in part on the comparison, a first surface normal associated with the first surface are;
determining a second surface normal associated with the second surface area; and
determining a third surface normal associated with a third surface area based at least in part on interpolating between the first surface normal and the second surface normal.

12. The method of claim 7, further comprising:
comparing the first width to the second width to determine a first surface normal for a first portion of the surface; and
comparing a third width of the second laser pulse to a fourth width of the second return pulse to determine a second surface normal for a second portion of the surface.

13. The method of claim 7, further comprising:
determining, based at least in part on the comparison, a surface normal associated with the first surface area; and
transmitting, to a vehicle navigation system, surface normal information for controlling a direction of a vehicle, the surface normal information including information associated with the surface normal.

14. The method of claim 7, wherein the first width and the second width are represented in a time domain.

15. A method comprising:
emitting a first pulse at a first portion of a surface having a first pulse width, and a second pulse at a second portion of a surface;
receiving, at a sensor, a first return pulse associated with the first pulse;
determining, based at least in part on a comparison between the first pulse width and a second pulse width of the first return pulse, a first orientation of the surface; and
determining a surface discontinuity between a first surface area associated with the first pulse and a second surface area associated with the second pulse, based, at least in part, on a comparison between the first orientation and a second orientation of the second surface area.

16. The method of claim 15, further comprising:
determining a surface normal associated with the second portion of the surface based at least in part on a third width of the second pulse and a fourth width of a second return pulse,
wherein the surface discontinuity is determined further based, at least in part, on the surface normal.

17. The method of claim 15,
wherein the surface discontinuity is determined further based, at least in part, on a distance between the sensor and the second portion of the surface.

18. The method of claim 15, further comprising:
determining a set of candidate surface normals based at least in part on the first pulse width; and
controlling operation of a vehicle based at least in part on the set of candidate surface normals.

19. The method of claim 15, wherein the first pulse is reflected from an object, the first return pulse is associated with the first pulse reflected from the object, and the surface is associated with the object.

20. The method of claim 15, wherein the first pulse width and the second pulse width are represented in a time domain.

* * * * *